(12) United States Patent
Tagami

(10) Patent No.: US 6,437,834 B1
(45) Date of Patent: Aug. 20, 2002

(54) VIDEO SWITCHING AND MIX/EFFECTING EQUIPMENT

(75) Inventor: Hiroyasu Tagami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/320,972

(22) Filed: May 27, 1999

(30) Foreign Application Priority Data

May 27, 1998 (JP) ............................................. 10-145633

(51) Int. Cl.[7] .............................................. H04N 5/268

(52) U.S. Cl. ........................ 348/705; 348/554; 348/555; 348/584

(58) Field of Search ................................ 348/705, 706, 348/534, 555, 441, 556, 557, 584, 708, 722, 901, 908, 445, 450; 345/718; H04N 5/268, 5/265

(56) References Cited

U.S. PATENT DOCUMENTS

| | | | | |
|---|---|---|---|---|
| 5,461,427 A | * | 10/1995 | Duffield et al. ............. | 348/555 |
| 5,684,543 A | * | 11/1997 | Kobayashi ................... | 348/705 |
| 5,886,545 A | * | 3/1999 | Sakuda et al. ................ | 327/99 |
| 5,896,181 A | * | 4/1999 | Takamori ..................... | 348/705 |
| 6,081,297 A | * | 6/2000 | Lee ............................. | 348/426 |
| 6,122,018 A | * | 9/2000 | Sugihara et al. ............ | 348/705 |
| 6,191,823 B1 | * | 2/2001 | Ahn ............................ | 348/554 |
| 6,201,580 B1 | * | 3/2001 | Voltz et al. .................. | 348/584 |
| 6,208,388 B1 | * | 3/2001 | Farleigh ...................... | 348/705 |
| 6,292,229 B1 | * | 9/2001 | Meyer ......................... | 348/705 |

OTHER PUBLICATIONS

Bit–Serial Digital Interface for High–Definition Television Systems: 1995 The Society of Motion Picture and Television Engineers; pp. 1–21.

1920 x 1080 Scanning and Interface; Dec. 19, 1995; The Society of Motion Picture and Television Engineers; pp. 1–21.

* cited by examiner

Primary Examiner—John W. Miller
Assistant Examiner—Jean W. Desir
(74) Attorney, Agent, or Firm—Katten Muchin Zavis Rosenman

(57) ABSTRACT

Video switching and mix/effecting equipment which performs video switching and mix/effecting by a single circuit configuration on SDTV and HDTV signals. The video switching and processing equipment comprises input converters for converting each of the HDTV signals into a set of low speed HDTV components; a switcher for performing switching so as to select plural sets of signals from the plurality of digital SDTV signals or from a plurality of corresponding components of low speed HDTV components to deliver selected plural sets of signals, the number of the plural sets of signals corresponding to the number of the low speed HDTV components converted from one HDTV signal; a plurality of video/mix effecting circuits provided in correspondence with the number of the low speed HDTV components, for processing the selected plural sets of signals; and an output converter for converting outputs of the low speed HDTV components from the respective video/mix effecting circuit and outputting an output HDTV signal, wherein the plurality of video/mix effecting circuits delivers plural sets of processed video signals of the SDTV signals or a plurality of the corresponding components of low speed HDTV components in accordance with the switching operation of the switcher.

8 Claims, 5 Drawing Sheets

Fig.1
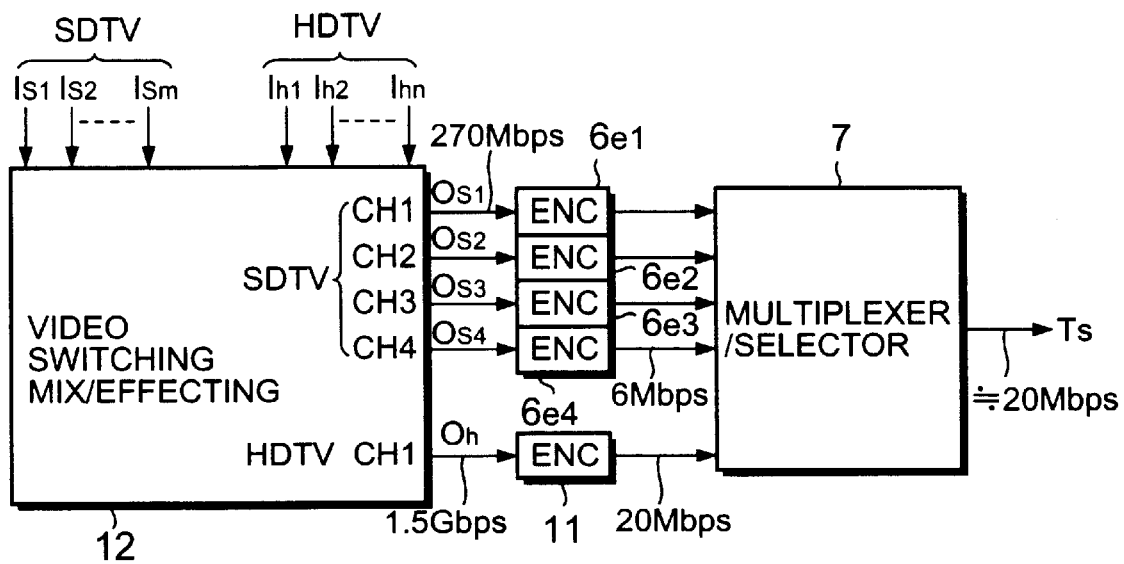
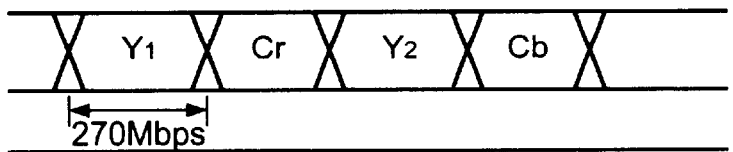
Fig.3(A)
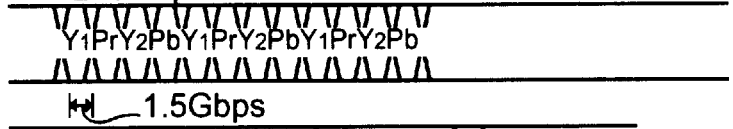
Fig.3(B)
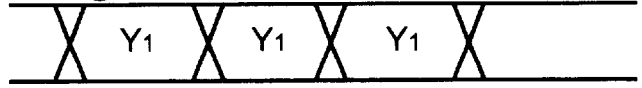
Fig.3(C)
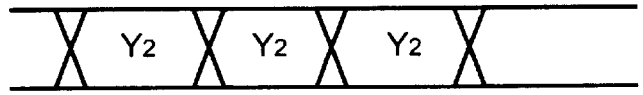
Fig.3(D)
Fig.3(E)
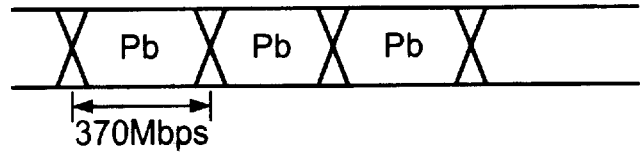
Fig.3(F)

VIDEO SWITCHING AND MIX/EFFECTING EQUIPMENT

BACKGROUND OF THE INVENTION

1. Field of the Invention

The present invention relates to equipment for processing television (video) signals, and more particularly, to video switching and mix/effecting equipment which switches SDTV (Standard Definition Television) signals and HDTV (High Definition Television) signals and processes the signals to produce TV signals for broadcast.

2. Description of Related Art

The SDTV broadcast such as the NTSC (National Television System Committee) standard and the like had been conventionally used. On the other hand, the HDTV broadcast, with the purpose of broadcasting a high definition video signal, has been expected and already been conducted in part by a MUSE (Multiple Sub-Nyquist Sampling Encoding) system of an analog type in Japan, for example. On the other hand, as HDTV standards applied in a broadcast station, the SMPTE standard 292M and the SMPTE standard 296M are determined to transmit and process a HDTV signal in digital form. Since the HDTV broadcast handles a large amount of information corresponding to the high definition video signal, it requires a transmission band wider than that for the SDTV broadcast.

Now preparation for digital television broadcast utilizing, e.g., a broadcast satellite or ground wave, is made. In a digital television broadcast system, MPEG coded television signals are used for increasing transmitting capacity and capability of transmitting a HDTV signal. Further, in the digital television broadcast system, plural SDTV signals can be broadcasted in multiple channels at same time due to such capability. Accordingly, it is possible to realize a broadcast system which selectively broadcasts multiple-channel SDTV-signals or a single channel HDTV-signal.

To realize the above broadcast system, a broadcast station switches the multiple-channel SDTV signals or the single channel HDTV signal for broadcasting, and also has functions to receive a plurality of source television (video) signals and to produce the video signal(s) to be broadcasted. For example, to produce a superimposed image and a split composite image, video composition processing, i.e., mix/effecting is performed in accordance with effect requirement.

Since video signals of the SDTV signal and the HDTV signal have different bands (frequencies) and formats, to perform video switching and mix/effecting, it has been conventionally necessary to provide SDTV video switching and mix/effecting equipment and HDTV video switching and mix/effecting equipment for the respective video signals. More specifically, if the SDTV signal is a serial digital component signal of the SMPTE standard 259M, its transmission speed (band) is 270 Mbps, and if the HDTV signal is a serial digital component signal of the SMPTE standard 292M, its transmission speed is 1.5 Gbps.

FIG. 8 shows a block diagram of the conventional digital broadcast system having an SDTV video switching and mix/effecting device 1 and an HDTV video switching and mix/effecting device 8. In the conventional broadcast system in FIG. 8, SDTV video signals are inputted from input terminals Is1 to Ism. Then an SDTV switcher 2 performs switching so as to select three sets of two video signals, and supplies them to video mix/effect circuits 3 to 5. The video mix/effect circuits 3 to 5 respectively combine the input two SDTV signals in correspondence with an effect image requirement, and output the combined SDTV signals, as outputs Os1 to Os3, to SDTV encoders 6e1 to 6e3. The respective encoders compression-encode the SDTV video signals of 270 Mbps into encoded signals of 6 Mbps, and supply the encoded signals to a multiplexer/selector 7.

On the other hand, HDTV video signals are inputted from input terminals Ih1 to Ihn. Then an HDTV switcher 9 performs switching so as to select two video signals, and supplies the selected signals to a video mix/effect circuit 10. The video mix/effect circuit 10 combines the input two HDTV video signals in correspondence with an effect image requirement, and outputs the combined HDTV signal, as an output Oh, to an SDTV encoder 11. The encoder 11 compression-encodes the combined HDTV signal of 1.5 Gbps into an encoded signal of 20 Mbps, and supplies the encoded signal to the multiplexer/selector 7.

The multiplexer/selector 7 multiplexes the compressed SDTV signals of the three channels, and selectively outputs the multiplexed three-channel SDTV signals or the single-channel HDTV signal.

However, in the configuration of the conventional digital broadcast system shown in FIG. 8, the video switcher and video mix/effect circuit for the SDTV video signals, and the video switcher and video mix/effect circuit for the HDTV video signals should be individually provided. Further, since the HDTV video signal has a signal rate of 1.5 Gbps and requires high-speed signal processing in the video switcher 9 and the video mix/effect circuit 10, the specification of the video switcher 9 and the video mix/effect circuit 10 becomes higher, more complicated and costly. Therefore, as a whole, the conventional digital broadcast system is large in size and cost thereof increases.

SUMMARY OF THE INVENTION

The present invention has been made in consideration of the above situation, and has its object to provide video switching and mix/effecting equipment which can perform switching and mix/effect processing on SDTV and HDTV video signals through the same circuit (hardware).

Further, another object of the present invention is to provide video switching-and-mix/effecting equipment which can eliminate the necessity of high-speed switching and mix/effect processing on HDTV video signals.

According to the present invention, the foregoing object is attained by providing video switching and mix/effecting equipment receiving a plurality of digital high definition television (HDTV) signals and a plurality of digital standard television (SDTV) signals, comprising: input conversion circuits for converting each of said HDTV signals into each set of low speed HDTV components; switching circuit for performing switching so as to select plural sets of signals from said plurality of digital STVD signals or from a plurality of corresponding components of low speed HDTV components to deliver selected plural sets of signals, the number of the plural sets of signals corresponding to the number of the low speed HDTV components converted from one HDTV signal; a plurality of signal processing circuits provided in correspondence with the number of said low speed HDTV components, for processing said selected plural sets of signals; and output conversion circuit for converting outputs of the low speed HDTV components from said respective signal processing circuits and outputting an output HDTV signal, wherein said plurality of signal processing circuits deliver plural sets of processed video signals of said SDTV signals or a plurality of the corresponding components of low speed HDTV components in accordance with switching operation of said switching circuit.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing of a digital broadcast system employing video switching and mix/effecting equipment according to the present invention;

FIG. 3(A) shows a signal format of an SDTV signal inputted into a switcher in FIG. 2;

FIG. 3(B) shows a signal format of an HDTV signal inputted into the switcher in FIG. 2;

FIGS. 3(C) to 3(F) show format arrangements of the components of a low speed converted HDTV signal;

DETAILED DESCRIPTION OF THE PREFERRED EMBODIMENTS

Preferred embodiments of the present invention will now be described in detail in accordance with the accompanying drawings.

Figure 8:
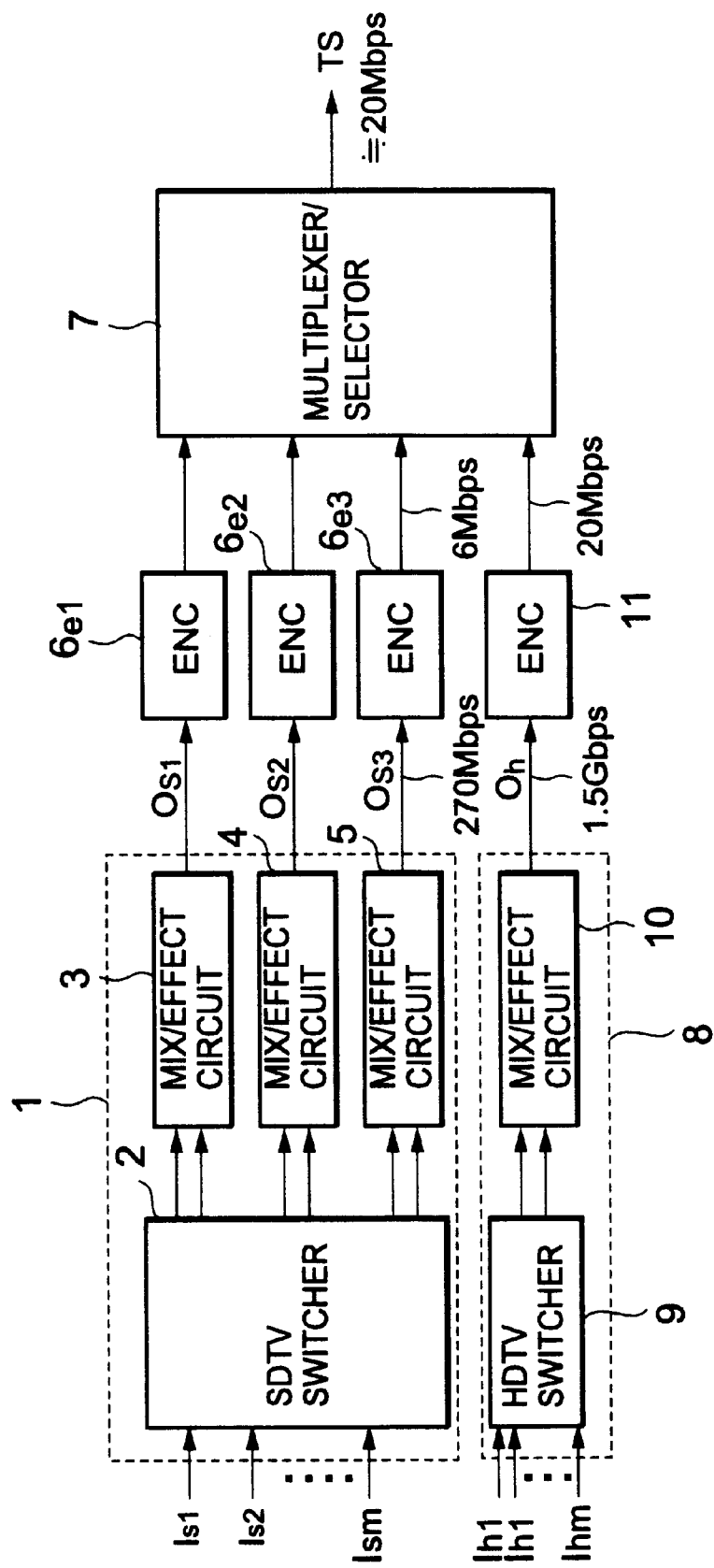
FIG. 8 is a block diagram showing the prior art digital broadcast system employing conventional video switching and mix/effecting equipment.

Referring to FIG. 1 showing a digital broadcast system employing video switching and mix/effecting equipment according to the present invention, a plurality of SDTV signals and HDTV signals are supplied to the single video switching and mix/effecting equipment 12. The video switching and mix/effecting equipment 12 outputs combined (effected) four-channel SDTV video signals Os1 to Os4 and a combined (effected) one-channel HDTV video signal Oh, to encoders 6c1 to 6c4 and 11, thereafter, supplied to the multiplexer/selector 7. Note that the encoders 6c1 to 6c4 and 11 and the multiplexer/selector 7 are the same as the encoders 6c1 to 6c3 and 11 and the multiplexer/selector 7 in FIG. 8. In FIG. 1, the number of the combined SDTV signals is larger than that in FIG. 8, however, in the multiplexer/selector 7, three of the four signals can be selected and multiplexed. Further, if the video switching and mix/effecting equipment 12 has a function to select the three combined SDTV video signals from the four combined SDTV video signals, the number of the encoders 6 is the same as in FIG. 8. Hereinafter, the video switching and mix/effecting equipment 12 will be described in detail.

Figure 2:
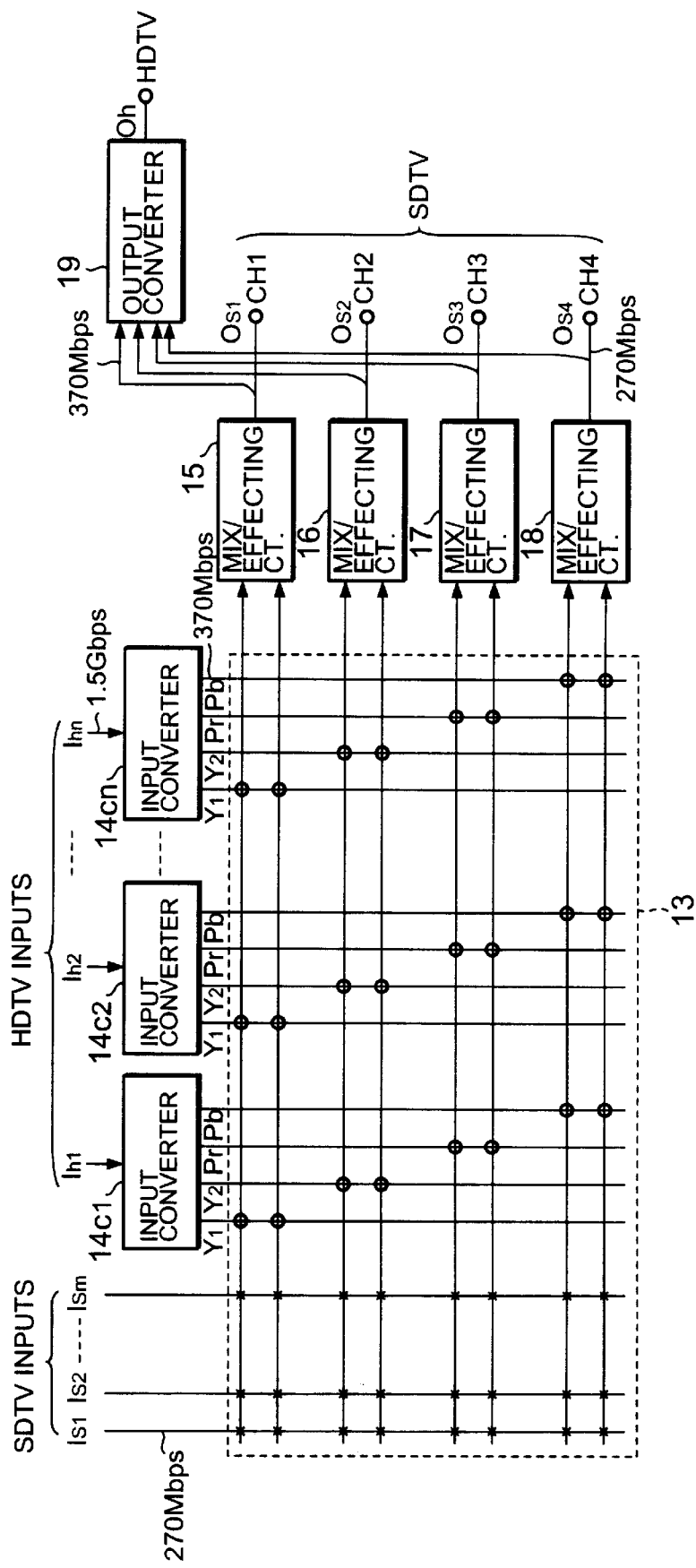
FIG. 2 is a diagram showing an embodiment of the video switching and mix/effecting equipment according to the present invention.

FIG. 2 shows the video switching and mix/effecting equipment 12 (FIG. 1) according to the present invention. In FIG. 2, switching function is performed by a switcher 13 and input converters 14c1 to 14cn which convert HDTV video signals into low speed HDTV video components. SDTV signals from input terminals Is1 to Ism are supplied to matrix-arranged cross points of the switcher 13 without any speed conversion. On the other hand, the HDTV video signals from input terminals Ih1 to Ihn are converted into the low speed HDTV video components, i.e., four parallel data Y1, Y2, Pr and Pb signals, by the input converters 14c1 to 14cn, and supplied to the matrix-arranged cross points of the switcher 13. By the conversion of the HDTV signal into the low speed HDTV video components, it becomes possible to switch the SDTV signal and HDTV signal in the switcher 13 in common.

FIGS. 3(A) to 3(F) show the formats of the SDTV, HDTV and low speed HDTV component signals processed in the switching and mix/effecting equipment 13. As shown in FIG. 3(A), the SDTV signal is serial digital data of a component format, including luminance components Y1 and Y2 and color components Cr and Cb arrayed as shown in the figure. The HDTV video signal has also a component format of serial digital data as shown in FIG. 3(B), however, the speed of the HDTV video signal is 1.5 Gbps. As shown in FIGS. 3(C) to 3(F), the HDTV video signal is converted into 370 Mbps parallel digital data of components Y1, Y2, Pr and Pb, and supplied to the switcher 13. The switcher 13 has electrical characteristic and specification to process the 270 Mbps SDTV signal and the converted 370 Mbps HDTV signals. Note that the converters 14 will be described in detail with reference to FIG. 4.

Returning to FIG. 2, when the SDTV signal is transmitted as the broadcast output, the switcher 13 selects arbitrary two SDTV video signals and supplies the selected signals to video mix/effecting circuits 15 to 18. The video mix/effecting circuits 15 to 18 combine the selected video signals in accordance with required effects, and output the combined video signals as SDTV outputs Os1 to Os4. On the other hand, when the HDTV signal is transmitted as the broadcast output, the video mix/effecting circuits 15 to 18 combine the low speed converted parallel data, i.e., the components Y1, Y2, Pr and Pb, respectively. For this purpose, the switcher 13 has cross points to supply the component Y1 to the mix/effecting circuit 15, the component Y2 to the mix/effecting circuit 16, the component Pr to the mix/effecting circuit 17, and the component Pb to the mix/effecting circuit 18. The combined components Y1, Y2, Cr and Cb from the mix/effecting circuits 15 to 18 are supplied to an output converter 19. The output converter 19 converts the parallel data of the respective components into the same format of the initial 1.5 Gbps serial digital signal and outputs the converted output as the HDTV signal Oh. The video mix/effecting circuits 15 to 18 will be described in detail with reference to FIG. 5. The output converter 19 will be described in detail with reference to FIG. 6.

Figure 4:
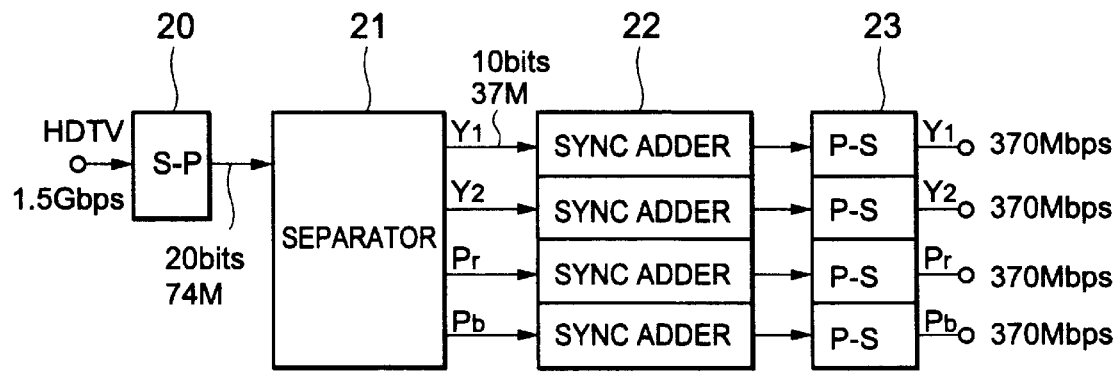
FIG. 4 is a block diagram showing an input converter for the HDTV video signal in FIG. 2.

In FIG. 4 showing the input converter 14 (FIG. 2), first, a serial-parallel (S-P) converter 20 converts the 1.5 Gbps serial digital signal of the SMPTE standard 292M into 20-bit, 74 MHz parallel data of the SMPTE standard 274M. Further, a separator 21 converts the parallel data into 10-bit, 37 MHz data of respective components. Synchronizing data adder 22 add EAV data or the like to the 10-bit, 37 MHz data for respective components, outputted from the separator 21, such that the 10-bit, 37 MHz data becomes to have the data format corresponding to the data format of the SDTV video signals to be inputted into the switcher 13. Thereafter, parallel-serial (P-S) converters 23 convert the parallel data into 370 Mbps serial digital data for the respective components.

Figure 5:
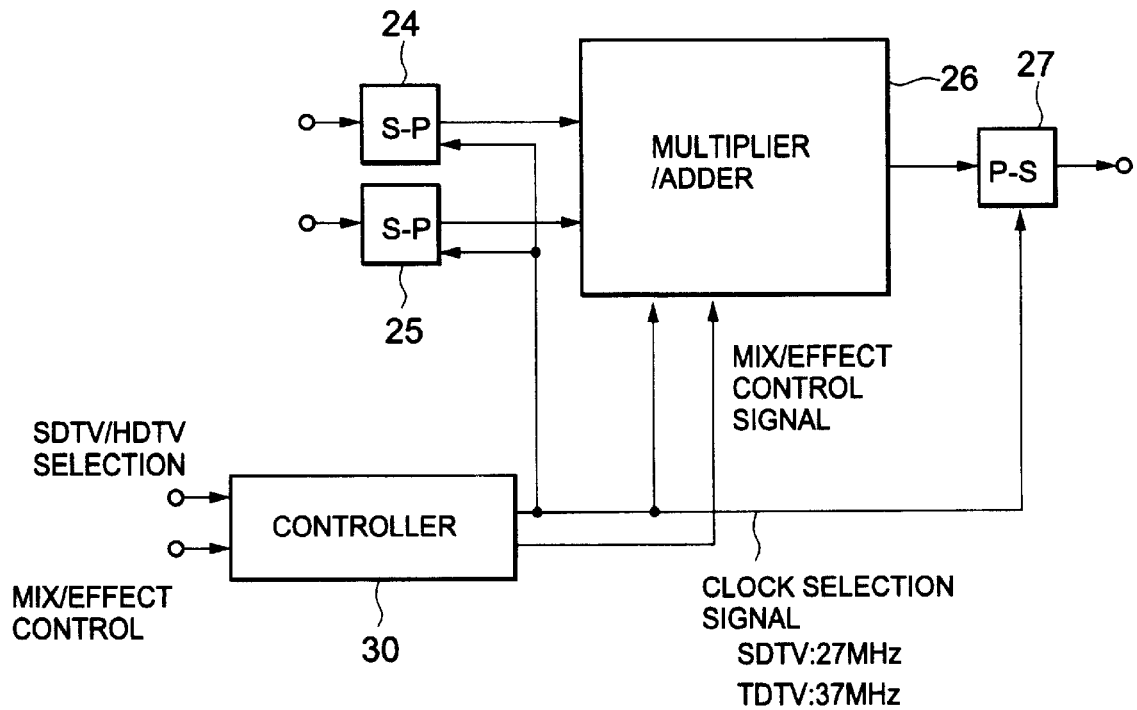
FIG. 5 is a block diagram showing a video mix/effecting circuit in FIG. 2.

Referring to FIG. 5, the video mix/effecting circuit 15 (16–18) comprises serial-parallel (S-P) converters 24 and 25 which convert two input serial digital data into parallel data respectively, a multiplier/adder 26 which combines the two parallel converted data in accordance with respective weights corresponding to an effect control signal, a parallel-serial (P-S) converter 27 which converts the combined parallel data into serial data, and a controller 30 which controls clock selection between 27 MHz for the SDTV signal and 37 MHz for the HDTV signal and the combination weights corresponding to the effect control. In the present embodiment, the video mix/effecting circuit receives two signals and combines them, however, the present invention is not limited to this arrangement. To produce a more complicated effect image, the number of inputs can be increased. For example, to produce a combined image of four independent video images, four input video signals are selected and supplied to the video mix/effecting circuit. Further, when an original input video signal is used for broadcasting itself, it is unnecessary to combine plural video signals in the video mix/effecting circuit and, in this case, the mix/effecting circuit operates to pass the original input video signal.

In the video mix/effecting circuit 15 to 18, the combining operation is performed for each pixel. In this connection, the position of EAV data are used as a reference in each scan line. Further, upon the SDTV operation, the respective video mix/effecting circuits 15 to 18 perform individual combining operations different from each other, and output the different processed SDTV signals to the output terminals Os1 to Os4 (FIG. 2). On the other hand, upon the HDTV operation, the respective video mix/effecting circuits 15 to 18 perform the same combining operation to the respective low speed converted HDTV signal components, and output the processed low speed HDTV signal components to the output converter 19 (FIG. 2). Thus, the desired processed HDTV signal is outputted from the output terminal Oh (FIG. 2).

Figure 6:
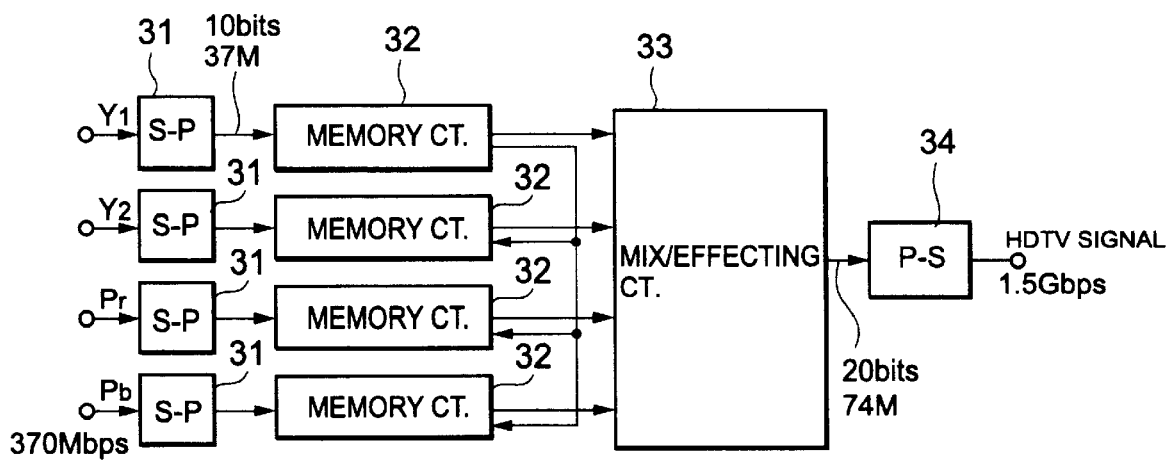
FIG. 6 is a block diagram showing an output converter for the HDTV video signal in FIG. 2.
Figure 7:
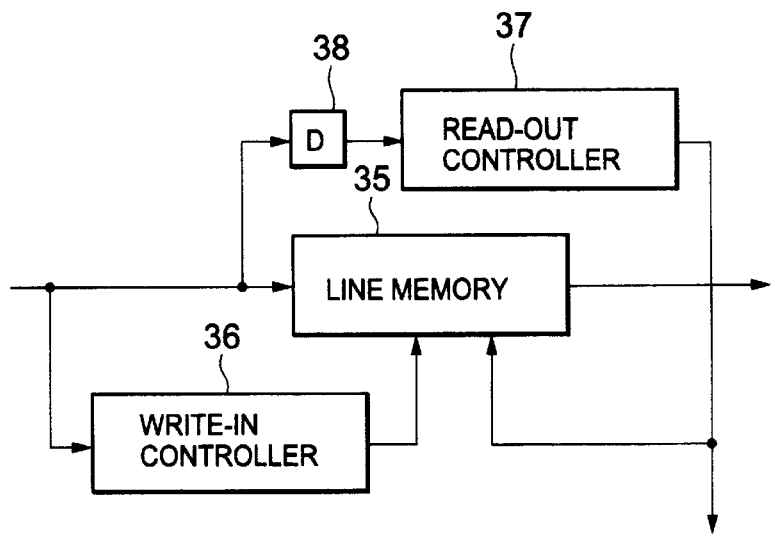
FIG. 7 is a block diagram showing a memory circuit in FIG. 6.

Referring to FIG. 6, the output converter 19 comprises serial-parallel (S-P) converters 31 which convert 370 Mbps serial digital data of the respective components into 10-bit, 37 MHz parallel digital data, memory circuits 32 which eliminate timing (phase) differences contained in the respective 10-bit, 37 MHz parallel digital data, a combining circuit 33 which converts the read-out data from the memory circuits 32 into 20-bit, 74 MHz data, and a parallel-serial (P-S) converter 34 which converts the data from the combining circuit 33 into the 1.5 Gbps serial HDTV signal. In FIG. 7 showing block diagram of the memory circuit 32, the circuit 32 includes a line memory 35, a writing control circuit 36 for controlling writing operation in the line memory 35 on the basis of the EAV timing contained in the input data, and a read-out control circuit 37 for delivering a read-out timing signal which is supplied to the line memories 35 of the all of the memory circuits 32 in common for timing coincident read-out. For the timing coincident read-out of the memory circuits 32, a delay 38 is provided before the read-out control circuit 37. The delay 38 has a delay time corresponding to the possible maximum delay time between the respective component data plus a write/read operation time of the line memory 35. Accordingly, as regards the read-out control circuit 37 and delay 38, they are provided in only one of the four memory circuits 32.

According to the arrangement of the embodiment of the present invention, the four-channel SDTV signals or one-channel HDTV signal can be switched and outputted with mix/effecting operation, while applying the common circuit configuration of the video switching and mix/effecting equipment for both HDTV and SDTV signals. In this embodiment, the input converter 14 segments the 1.5 Gbps HDTV signal into four low speed converted components to supply them to the switcher 13. As the signal rate of the low speed converted HDTV components is 370 Mbps and closed to 270 Mbps of the SDTV signal, high speed processing is not necessary in the switcher 13 and the video mix/effecting circuit 15 to 18.

As described above, according to the present invention, when switching and mix/effecting processing is performed on SDTV signals and HDTV signals, it is possible that the single circuit configuration performs processing on the multi-channel SDTV signals and the single-channel HDTV signal, and the hardware size of the equipment can be downsized. Further, since the high speed HDTV signal can be divided into a plurality of low speed converted HDTV signals, a video switching and mix/effecting device which does not require high speed signal processing can be realized.

The present invention is not limited to the above embodiment and various changes and modifications can be made within the spirit and scope of the present invention. Therefore, to appraise the public of the scope of the present invention, the following claims are made.

What is claimed is:

1. Video switching and processing equipment receiving a plurality of digital high definition (HD) video signals and a plurality of digital standard (SD) video signals, comprising:
input conversion means for converting each of said HD video signals into a set of low speed HD video components;
switching means for performing switching so as to select plural sets of signals from said plurality of digital standard (SD) video signals or from a plurality of corresponding components of low speed HD video components to deliver selected plural sets of signals, the number of the plural sets of signals corresponding to the number of the low speed HD video components converted from one HD video signal;
a plurality of signal processing means provided in correspondence with the number of said low speed HD video components, for processing said selected plural sets of signals; and
output conversion means for converting outputs of the low speed HD video components from said respective signal processing means and outputting an output HD video signal,
wherein said plurality of signal processing means delivers plural sets of processed video signals of said SD video signals or a plurality of the corresponding components of low speed HD video components in accordance with switching operation of said switching means.

2. The video switching and processing equipment according to claim 1, wherein each of said SD video signals contains digital components.

3. The video switching and processing equipment according to claim 1, wherein said low speed HD video components converted by said input conversion means have a signal rate close to a signal rate of said SD video signals.

4. The video switching and processing equipment according to claims 1, wherein said input conversion means divides each of said HD video signals into four low speed HD video components.

5. The video switching and processing equipment according to claim 4, said input conversion means divides each of said HD video signals into luminance components and color components.

6. The video switching and processing equipment according to claim 1, wherein said switching means and said signal processing means perform signal switching operation and processing operation on said HD video signals and said SD video signals in common.

7. A video switching and processing equipment receiving a plurality of digital high definition (HD) video signals and a plurality of digital standard (SD) video signals, comprising:

input conversion means for converting each of said HD video signals into a set of low speed HD video components;

switching means for performing switching so as to select plural sets of signals from said plurality of digital standard (SD) video signals or from a plurality of corresponding components of low speed HD video components to deliver selected plural sets of signals, the number of the plural sets of signals corresponding to the number of the low speed HD video components converted from one HD video signal; and output conversion means for converting outputs of the low speed HD video components from said switching means and outputting an output HD video signal, wherein the selected plural sets of said SD video signals or said output HD video signal is delivered in accordance with switching operation of said switching means.

8. A video switching and processing equipment receiving a plurality of digital high definition (HD) video signals and a plurality of digital standard (SD) video signals, comprising:

input conversion circuits for converting each of said HD video signals into a set of n low speed HD video components (n: integer);

selecting circuit for selecting at least n signals from said plurality of digital standard (SD) video signals to deliver selected signals when said video switching and processing equipment processes an SD video signal, and for selecting at least one set of the low speed HD video components from a plurality of corresponding components of low speed HD video components to deliver selected low speed HD video components when said video switching and processing equipment processes an HD video signal; and output conversion circuit for converting the selected low speed HD video components from said selecting circuit to output an output HD video signal.

* * * * *